Feb. 29, 1972 N. R. BYRD 3,645,999

POLYMERIC MATERIALS

Original Filed Sept. 13, 1965

NORMAN R. BYRD
INVENTOR.

BY Max Geldin

ATTORNEY 3,645,999

POLYMERIC MATERIALS

Norman R. Byrd, Dana Point, Calif., assignor to McDonnell Douglas Corporation, Santa Monica, Calif.

Continuation of application Ser. No. 486,833, Sept. 13, 1965. This application Oct. 23, 1969, Ser. No. 872,440
Int. Cl. C08f *7/04;* H01b *1/06*
U.S. Cl. 260—93.5 2 Claims

ABSTRACT OF THE DISCLOSURE

Poly(ring substituted-phenyl acetylene), where the ring substitution can be selected from one or more of nitro, amino, alkoxy, alkyl, alkylthio, hydroxyl, carboxyl, acyl, mercapto, cyano, halogeno, vinyl, and heterocyclic radicals, and copolymers thereof with olefinically unsaturated monomers are prepared. The polymers have great utility as semiconductors, primarily for use as detectors for polar and/or non-polar materials, in selective fashion.

This application is a continuation of application Ser. No. 486,833, filed Sept. 13, 1965.

This invention relates to a novel class of polymeric compounds, and is particularly concerned with a novel class of polymeric conjugated materials effective as semiconductors, and especially to a novel group of polyacetylenes having good semi-conductor characteristics, and to novel procedure for producing such compounds or materials.

There is a growing interest developing throughout the world in the field of organic semiconductors. Semiconductors are employed presently in a wide variety of devices including, for example, rectifying devices, probes and sensors, e.g., for sensing or detecting the presence of various substances such as in the detection of specific gases or vapors in the ambient atmosphere. Although inorganic semiconductors such as germanium and silicon have attained relatively wide usage in devices of these types, to date there have been few devices developed which utilize organic semiconductors, primarily because there have been too few organic materials developed which have enough desirable features to warrant their inclusion in such semiconductor devices. Presently, there have been few, if any, organic compounds having the necessary stability, degree of conduction, fabricability and inertness required for use as semiconductors in devices of the types noted above. Thus, work has heretofore been carried out on organics such as anthracene, phthalocyanines, both metal-containing and metal-free, charge-transfer complexes such as chloranil-p-phenylendiamine, and a few polymeric materials, such as pyrolyzed polymers or polyacene quinones. Of the few compounds developed for this purpose which do have some desirable features, e.g., phthalocyanines or perylene-iodine charge-transfer complex, they do not lend themselves to ready fabrication. One of the important criteria for successful semiconductors is the ability of the material to form good coherent films on a substrate. This important characteristic has not been obtainable heretofore with any degree of success employing organic semiconductors.

One object of the invention is the provision of a novel class of organic polymers useful as semiconductors.

Another object of the invention is to provide a new group of polymeric materials which are readily capable of being fabricated into any shape, from thin films and disks to complex shapes, having a conductivity in the region which permits their applicability as semiconductors, having long term stability, and which are of relatively low cost.

A particular object of the invention is the provision of a novel versatile class of acetylene polymers having properties of the type noted above and capable of use as semiconductors, and whose conductivity can be varied as desired by variation in the chemical composition of the polymer, and which is particularly suitable for production of semiconductive highly coherent films.

A still further object of the invention is the provision of novel procedure for the production of such acetylenic polymers.

Other objects and advantages of the invention will appear hereinafter.

The above objects are accomplished and a novel class of organic semiconductors are provided in the form of a conjugated polyunsaturate having a plurality of recurring units having the formula:

(I) 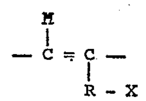

where R is aryl, e.g., phenyl, biphenyl, naphthyl, anthracenyl, phenanthrenyl, and the like, and X is a substituent or radical capable of changing the electrical conductivity of the otherwise unsubstituted polymer. Thus, X can be nitro, amino, alkoxy, alkyl, alkylthio, hydroxyl, carboxyl, acyl, mercapto, cyano, halogeno, such as chloro, fluoro, iodo or bromo, vinyl, and heterocyclic radicals such as azole, oxazole, thiazole, ferrocene, pyrrole, pyridine, pyrimidine, and the like. There is at least one X substituent, e.g., 1 to 2 X substituents, on each of the aromatic or carbocyclic nuclei R carried on the polymeric units of Formula I above, and the individual R nuclei of the polymer can carry one or more of the X substituents.

The preferred class of polymers according to the invention are those having recurring substituted phenylacetylene radicals having the formula:

(II) 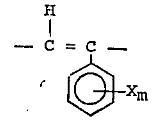

where X is a substituent or radical as defined above, and *m* is an integer of at least 1, and preferably from 1 to 2, although *m* may be more than 2.

In preferred practice, the polymers of the invention are arylacetylene homopolymers having the formula:

(III) 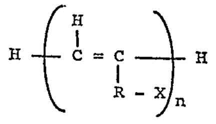

Most desirably, such polymers are poly(phenylacetylene) homopolymers having the formula:

(IV) 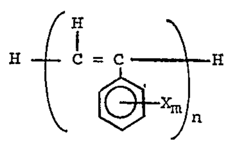

where R, X and *m* have the values set forth above, and *n* is an integer of at least 2, preferably ranging from about 4 to about 100. The poly(phenylacetylene) homopolymers of Formula IV above preferably have a molecular weight ranging from about 1,700 to about 10,000.

Preferred polymers according to the invention are the poly-(nitrophenyl acetylene), poly-(aminophenyl acetylene), poly-(methoxyphenyl acetylene), poly-(cyanophenyl acetylene) and poly-(t-butylphenyl acetylene) polymers.

It is seen from the structure of the polymers (I) to (IV) above of the invention that such polymers have a backbone of conjugated acetylenic linkages which permits a flow of electrons along the polymer backbone. The aryl group R, e.g., the phenyl group, attached to the acetylenic moieties along the polymer backbone are also conjugated resonating systems which can permit a flow of electrons from such aryl substituents forming side chains, to the polymer backbone, to provide conduction from positions on such R substituents to and through the polymer backbone. As will be seen more clearly hereinafter, the aryl groups, e.g., the phenyl groups, attached to the polymer backbone, function as vehicles for the passage or transfer of electrons from the X substituents or radicals attached to said aryl substituents, to the polymer backbone.

The X substituents noted above which are attached to the aryl nuclei carried as side chains on the polymer backbone, have varying degrees of electron donating or electron withdrawing capability. Thus, by selecting a particular X substituent or substituents, the principles of the invention permit the production of semiconductive polymers having a broad spectrum of conduction capability. Thus, for example, if it is desired to provide a polymer according to the invention which is highly conductive, this can be achieved by incorporating on the aryl nuclei R or phenyl groups of the polymer backbone as many electron donating groups as possible, such as amino, alkoxyl, alkyl, alkylthio, or hydroxyl, and on the other hand, if it is desired to produce polymers according to the invention which have higher resistivity and are less conductive, electron withdrawing groups are incorporated onto the aryl substituents on the polymer backbone, such as nitro, cyano, carboxyl, acyl, and vinyl groups. Thus, for example, an acetylenic polymer according to the invention which carries both a methoxy and an amino group on the phenyl radical, e.g., in general Formula IV above, provides a polymer having substantially greater conductivity than the same polymer which carries only one such amino group on the phenyl nuclei, or a polymer which carries only one methoxy group on the phenyl nuclei. Further, a polymer according to the invention carrying two nitro groups on each of the phenyl nuclei of the polymer represented by (IV) above provides a polymer which has less conductivity than a corresponding polymer which carries only one nitro group on the respective phenyl nuclei, or conversely a polymer of the type illustrated by Formula IV above which carries two nitro groups as X substituents on each phenyl radical would constitute a stronger electron attracting polymer permitting it to form a better complex between it and a polymer of the same general type but which carries electron donating groups, e.g., amino groups, on the respective aryl or phenyl nuclei. A large number of variations of polymers of varying electronegativity thus can be provided according to the invention, e.g., by attaching two nitro groups on each monomer moiety, or two amino groups per monomer moiety, or alkyl, fluoro, carboxyl, cyano or any other combination of groups on the same polymer backbone. In addition, according to the invention, solutions of polymers of different electronegativity can be mixed to obtain polymeric charge-transfer complexes which can be employed as films or pressed disks as hereinafter described. Furthermore, films or disks of the separate polymers, an electron-donating polymer with an electron-withdrawing polymer, can be brought into juxtaposition to each other for the preparation of polymeric charge-transfer complexes.

Since, for example, poly(nitrophenylacetylene) is a strongly electron-withdrawing polymer, it will readily complex with any electron-donating agent, e.g., amines, ammonia, benzene, oxygen, mercaptans, and the like, causing a change in conductivity of the polymer of an amount permitting these individual materials thereby to be detected when the polymer is incorporated in a detection device forming a part of an electrical circuit therein. On the other hand, since poly(aminophenylacetylene) is an electron donating polymer, it will readily complex with carbon dioxide, aldehydes, e.g., benzaldehyde, ketones, nitriles such as benzonitrile, and acidic materials, causing a change in conductivity of the polymer of an amount similarly permitting detection of these individual materials when the polymer is incorporated in a suitable detection device.

It is in many instances difficult to introduce an electron donating group such as an amino group or an electron withdrawing group such as a nitro group directly unto the carbon atoms of an acetylenic polymer. On the other hand, the incorporation of a conjugated system such as that provided by the aryl radical R, e.g., the phenyl radical, attached to the polymer backbone, permits facile introduction of such electron donating or electron withdrawing groups X unto the aryl or phenyl nuclei, which because of their resonating conjugated systems, have the advantage that the electron density of the attached group on the aryl or phenyl radical can be transmitted or passed through the aryl or phenyl group in resonant distribution, to the conjugated backbone of the polymer.

With respect to the nature of the acetylenic polymer backbone, the more conjugated double bonds which are introduced in contiguous fashion into the polymer, that is the longer the length of the polymer chain, particularly with respect to homopolymers such as those illustrated by Formulas III and IV above, the more brittle the polymer becomes. Thus, homopolymers of this type which have too high a molecular weight, e.g., above about 10,000, are not preferred. However, this tendency toward brittleness with increase in molecular weight can be alleviated by copolymerization, and flexibility of the polymer is thereby increased, employing the copolymers of aryl acetylenes or copolymers of phenyl acetylenes, of the types described hereinafter.

The following are examples of specific conjugated polymeric semiconductive materials provided according to the invention each having a plurality of recurring groups of the respective formulae noted below:

1.
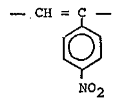

2.
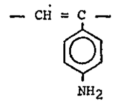

3.
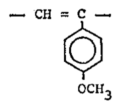

4.
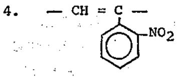

5.
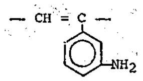

6.
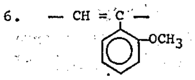

7.
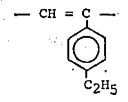

8.
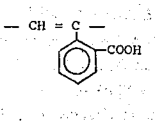

9.
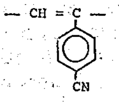

10.
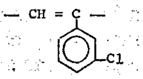

11.
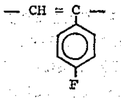

12.
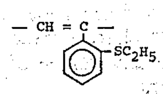

13.
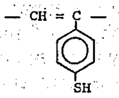

14.
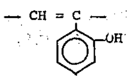

15. 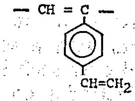

16. 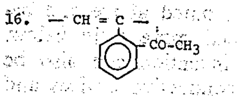

17. 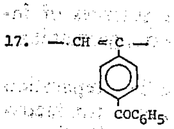

18. 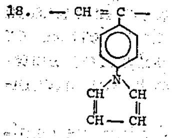

19. 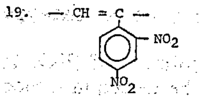

20. 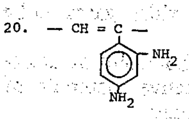

21. 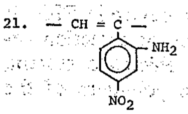

22. 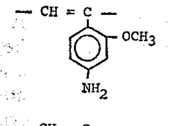

23. 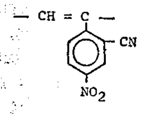

24. 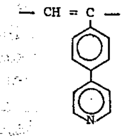

25. 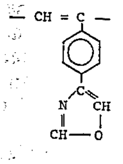

26. 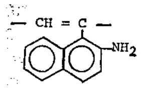

27. 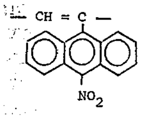

28. 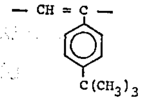

29. 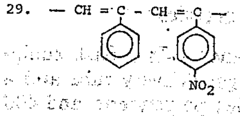

30. 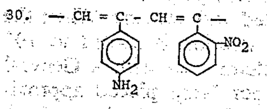

31. 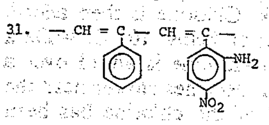

32. 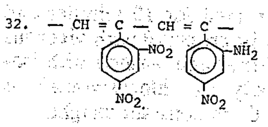

33. 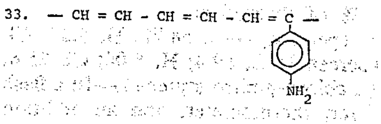

34. 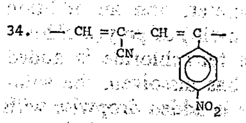

35. 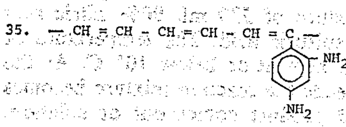

36. 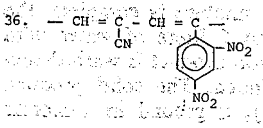

Referring to the specific examples set forth above, for example, polymers containing the recurring units 1, 2 and 3 above, these polymers, and mixtures and combinations thereof all have a different degree of electronegativity.

Basically, the semiconductive polymeric materials of the invention, for example, homopolymers of substituted phenyl acetylenes according to Formula IV above, are produced by halogenating, e.g., chlorinating, the appropriate polymer, such as polystyrene, to form the corresponding alpha halogenated polymer, e.g., poly(alpha-chlorostyrene), and the resulting halogenated material is then dehydrohalogenated and then reacted to incorporate the substituent X, or such halogenated material can be substituted, that is, suitably reacted to introduce the X substituent or substituents, and then dehydrohalogenated. Although the substituted arylacetylene polymers produced according to these procedures are generally substantially free of chlorine, in some instances they may contain small amounts of chlorine.

Thus, for example, starting with polystyrene, this material can be chlorinated to form poly(alpha-chlorostyrene), (a) the resulting chlorinated material can then be reacted with a nitrating agent to form poly(alpha-chloronitrostyrene), and the latter nitrated material can then be dehydrochlorinated using a suitable dehydrochlorinating agent such as lithium chloride in dimethyl formamide solution, to produce the product poly(nitrophenylacetylene). Alternatively, (b) according to a novel mode of procedure, a poly(alpha-chlorostyrene) produced as noted above, can first be dehydrochlorinated employing a suitable Lewis acid, such as zinc chloride, stannic chloride, or aluminum chloride, but preferably employing a Lewis acid which does not adversely affect, that is, degrade the molecular weight of the polymer, preferably zinc chloride. The resulting poly(arylacetylene) or poly(phenylacetylene) is then reacted with a suitable reagent for incorporation of the X substituent on the polymer, e.g., by reaction with a suitable nitrating agent for production of a poly (nitrophenyl acetylene).

The following illustrates the course of the above reactions (a) and (b).

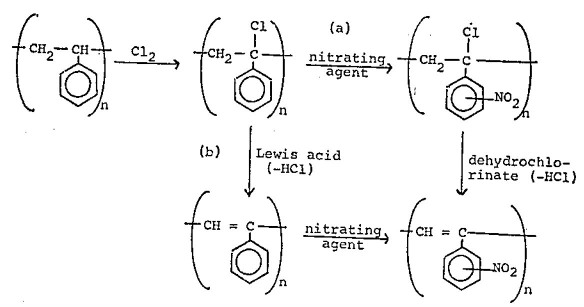

In the procedures for production of the conjugated acetylenic polymers of the invention as set forth above, the molecular weight of the polymeric starting material, e.g., polystyrene is degraded or reduced to some extent, particularly during the dehydrohalogenation step of the sequence of reactions.

It is accordingly preferred to carry out the procedure in such manner as to minimize as much as possible this reduction or degradation in the molecular weight proceeding from the polymeric starting material to the conjugated substituted acetylenic polymer, e.g., poly(aminophenyl acetylene) or poly(nitrophenyl acetylene). It has been found that by proceeding from the alpha chlorinated polymeric material to the dehydrohalogenated product by reaction of the alpha chlorinated material with a Lewis acid, preferably zinc chloride, according to the preferred mode of procedure and the reaction scheme (b) above, followed by incorporation of the X substituent, e.g., the nitro or amino group, that such degradation of the molecular weight from the initial polymer to the final substituted conjugated acetylenic polymer of the invention, is greatly minimized.

As previously noted, the flexibility of the acetylenic semiconductor polymers of the invention can be increased by forming copolymers with the aryl substituted acetylenic moieties such that the conjugated character of the final polymeric backbone is preserved, and such copolymer accordingly possesses semiconductive properties as in the case of the homopolymers. In producing such copolymers according to the invention, the starting material can be, for example, a copolymer of styrene and butadiene, a copolymer of styrene and acrylonitrile or a copolymer of styrene and vinyl ferrocene, or any other combination of monomers desired which on copolymerization produces the desired conjugated polymer chain or backbone, where one of such monomers carries an aryl, e.g., phenyl substituent, and is capable of halogenation on the alpha carbon atom of such monomer and is thereafter capable of dehydrohalogenation to form the acetylenic linkages of the type noted above in Formula I, such as acetylenic monomer. Accordingly such copolymers have acetylenic units of the Formulae I or II above interconnected by alternate different recurring moieties such as divalent butadiene, acrylonitrile, vinyl radicals and the like. Thus, for example, employing a copolymer of styrene and acrylonitrile as starting material, such copolymer can be chlorinated under suitable conditions to form the corresponding copolymer in which the alpha carbon atom of each monomer species contains a substituent chlorine atom, such chlorinated material then dehydrochlorinated using zinc chloride according to the invention procedure to form the corresponding conjugated polymer backbone having aryl, e.g., phenyl, substituted acetylenic moieties, and the resulting acetylenic copolymer then reacted with a suitable material such as a nitrating agent, to incorporate a substituent corresponding to X of the Formulas I to IV above, and previously defined, on the aryl or phenyl side group connected to the acetylenic moieties. Copolymers of this type which are relatively flexible and have substantially high molecular weight can thus be produced.

Thus, the degree of flexibility, solvent resistance, conductivity, thermal stability and other physical properties can be varied depending upon the type of polymer backbone employed.

The substituted acetylenic polymers of the invention, preferably the homopolymers of the types defined in Formulas III and IV above, have particular utility as semiconductors as result of the salient feature as described above of the ability to readily control the conductivity and other physical properties of these materials. Due to the ability of the acetylenic polymeric materials of the invention to form films, such polymers can be employed to produce panels, coatings, membranes, sandwich structures for rectifying devices and other important applications. Most of the polymeric semiconducting materials heretofore produced have possessed too low a molecular weight to form good coherent films. Further, the polymeric semiconductive materials of the invention can be employed as coatings or adhesives which will exhibit enhanced bonding between the conjugated polyunsaturate and the substrate, particularly if it is a metal substrate. Of particular significance, the semiconductors of the invention are valuable for application in probes or detectors to sense and differentiate between various gaseous substances or vapors, as well as affording radiation protection through the conjugated polymeric backbone. When employed as probes or sensors, as previously noted, the polymers can be employed separately or in admixture to produce charge-transfer complexes.

For producing semiconductor devices employing the polymeric semiconductors of the invention, the polymer can be applied to a substrate, preferably a metallic substrate, so that the base metal upon which the film is deposited or placed can function as one of the electrodes. Thus, for example, a film of the semiconductive polymeric material can be placed on a base metal in the form of a lock and key electrode system with a space between the electrodes and a film applied over such lock and key electrode system to provide electrodes on the surface and a polymeric film distributed above and between such electrodes, as described more fully below. The polymeric materials of the invention can also be deposited on wires to form semiconductive devices and also such films can be deposited on the surfaces of inorganic semiconductors, for example, silicon, germanium, gallium arsenide, and the like.

The following are examples illustrating the preparation of polyunsaturates according to the invention, conductivity properties thereof, and their mode of application.

The invention is described further below in relation to certain embodiments of semiconducting devices or detectors including the semiconductive polymeric materials of the invention, in connection with the accompanying drawings wherein.

EXAMPLE 1

Poly(p-nitrophenyl acetylene)

Figure 1:
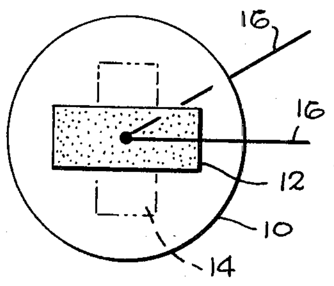
FIG. 1 illustrates an embodiment employing the semiconductive materials herein the form of a disc-type detection device.

Synthesis of poly($\alpha$ chlorostyrene).—In a flask equipped with a stirrer, thermometer, gas delivery tube and a gas outlet, is placed 104 g. (1 mole) polystyrene, and 400 ml. carbon tetrachloride is added with stirring. When the polystyrene has dissolved, the solution is cooled to 10° C., and the cold solution is illuminated with a General Electric 400 watt Mercury vapor lamp placed approximately 3 inches from the flask. Chlorine is then added. The reaction mixture is kept at or below 10° C. while a flow stream of 75 g. (1 mole) chlorine is added over a period of 5 hours. The reaction becomes slower near the end of the reaction. After all of the chlorine has been added, the reaction mixture is stirred for 10 minutes and the solution is then poured into isopropanol with vigorous stirring. The mixture is then filtered and washed with isopropanol, and the product, poly ($\alpha$ chlorostyrene), is dried in a vacuum oven at 50° C. to constant weight.

Yield-close to 100% of theoretical.

*Elemental analysis* (percent).—C, 68.72; H, 5.30; Cl, 25.98. Theoretical (percent): C, 69.4; H, 5.06; Cl, 25.6.

Synthesis of poly($\alpha$ chloro-p-nitro styrene).—In a flask equipped with a stirrer, thermometer, and an addition funnel, there is placed 147.5 g. (1 mole) of poly($\alpha$ chlorostyrene) and 800 ml. of carbon tetrachloride is added with stirring. After the polymer has dissolved, the solution is cooled to 10° C. and there is added dropwise with vigorous stirring a mixture of 520 ml. 90% nitric acid and 130 ml. of 98% sulfuric acid. The temperature of the reaction mixture is kept at or below 10° C. As the nitration reaction proceeds the reaction mixture becomes viscous as the nitrated product comes out of solution. After the addition of the acid mixture is complete, the reaction mixture is poured into 2 liters of water with vigorous stirring, and the reaction product is washed several times with water and filtered. The solid product, poly ($\alpha$ chloro-p-nitro styrene), is ground in a mortar and pestle with water to remove trapped acid, and the mixture filtered and washed with water until the washings are neutral, and is finally washed with acetone and the product dried.

Yield 93.5% of theoretical.

Synthesis of poly(p-nitro phenyl acetylene).—91.75 g. poly (α chloro-nitro styrene) and 90 g. lithium chloride are placed in a flask equipped with a stirrer, reflux condenser and thermometer. The mixture is dissolved in 500 ml. of N,N-dimethyl formamide, and the resulting mixture heated to reflux for 48 hours. The reaction mixture is cooled and the solution poured into 2 liters of water and filtered. The product containing poly(p-nitrophenyl acetylene), is washed with 10% sodium hydroxide solution, acidified with acetic acid and then washed with water until the washings are neutral. The product is then dried in a vacuum oven at 50° C.

EXAMPLE 2

Poly(p-nitrophenyl acetylene) (employing zinc chloride dehydrohalogenation)

Synthesis of poly(phenyl acetylene).—In a flask equipped with a stirrer, reflux condenser, and thermometer, is placed 138.5 g. (1.0 mole) of poly(α chlorostyrene, and 150 ml. nitrobenzene is added. When the polymer is in solution, 0.1 g. anhydrous zinc chloride is added and the mixture is heated to reflux with stirring. The mixture is refluxed for 24 hours, cooled and poured into 1 liter of isopropanol. The precipitate is washed with isopropanol, water, and concentrated hydrochloric acid, then with water and isopropanol. The precipitated polymer is then redissolved in benzene, filtered and reprecipitated into isopropanol, filtered and dried.

Preparation of poly(p-nitrophenyl acetylene).— 102 g. poly(phenylacetylene) is dissolved in an ice cold mixture of 500 ml. 90% nitric acid and 300 ml. 98% sulfuric acid and the mixture allowed to react at 0° C. for 10 minutes. The solution is then poured into 2 liters of water, neutralized with sodium acetate, centrifuged and the supernatant liquid decanted. The reaction product, poly (p-nitrophenyl acetylene), is filtered, washed with water thoroughly to remove acid, then with isopropanol, and is then dried.

EXAMPLE 3

Poly(p-aminophenyl acetylene) (using sodium hydrosulfite)

In a 3 neck round bottom flask equipped with a stirrer, thermometer and condenser, is placed 16.75 g. (0.1 mole) of poly(p-nitrophenyl acetylene). This material is dissolved in 100 ml. dimethyl formamide. To this solution is added 35 g. sodium hydrosulfite (0.2 mole) and 15 ml. of water. The mixture is heated to 100° C. for 6 hours, cooled and poured into 1 liter of water. The precipitated product, poly(p-aminophenyl acetylene), is filtered, washed with water and dried.

EXAMPLE 4

Poly(p-aminophenyl acetylene) (using stannous chloride)

In a 250 ml. 3 neck round bottom flask equipped with stirrer, reflux condenser and thermometer, is placed 7.35 g. (0.05 mole) poly(p-nitrophenyl acetylene). The latter material is dissolved in 50 ml. dimethyl acetamide. To this solution is added 10 ml. of concentrated hydrochloric acid followed by a solution of 20 g. anhydrous stannous chloride and 50 ml. of dimethyl acetamide and 10 ml. concentrated hydrochloric acid. The mixture is heated to reflux for 5 hours, cooled and poured into 250 ml. of 25% sodium hydroxide solution, causing a vigorous reaction. The reaction mixture is then cooled and the solid polymer, poly(p-aminophenyl acetylene), is removed, the polymer washed with water until the washings are neutral.

EXAMPLE 5

Poly(2,4-dinitrophenyl acetylene)

In a 250 ml. 3 neck flask equipped with a stirrer is placed 50 g. of concentrated sulfuric acid and 30 g. of fuming nitric acid. The flask is cooled with ice water bath, and to this mixture is gradually added 14.7 g. of poly(p-nitrophenylacetylene). The temperature in the flask is kept below 40° C. until all the polymer has been added. The flask is then heated on a boiling water bath for two hours. After cooling to room temperature, the mixture is cautiously poured into ice water, with stirring. The precipitated polymer, poly(2,4-dinitrophenyl acetylene) is filtered and washed free of the acids.

EXAMPLE 6

Poly(p-methoxyphenyl acetylene)

In a 250 ml. beaker is placed 11.7 g. of poly(p-aminophenyl acetylene). To this is added 100 ml. dimethylformamide and an aqueous solution of 8 g. sodium nitrite in 20 ml. water. The mixture is cooled with ice water and then poured into a beaker containing 20 ml. of concentrated hydrochloric acid and 75 g. of ice. The mixture is stirred until the original brown color changes to a deep reddish-brown. The resultant slurry is added to a hot (120° C.) solution of dilute sulfuric acid, and kept there for two hours. The precipitated polymer is filtered, washed free of acid and redissolved in tetrahydrofuran. To this solution is added 8 g. pyridine followed by 13 g. dimethylsulfate. The solution is warmed on a boiling water bath for two hours, and the resultant poly(p-methoxyphenyl acetylene) is precipitated into n-butanol. The polymer is filtered and washed with water, 10 percent caustic solution, water, and finally with ethanol.

EXAMPLE 7

Poly(p-cyanophenyl acetylene)

A solution of 11.7 g. of poly(p-aminophenyl acetylene) in 200 ml. dimethylacetamide is diazotized at 5° C. with an aqueous solution of sodium nitrite (8 g. of sodium nitrite in 20 ml. water) and 20 ml. of concentrated hydrochloric acid. This diazonium chloride solution is added with rapid stirring to a cuprous cyanide solution, which is heated to 60° C. The cuprous cyanide solution is prepared by adding to a warm solution of 50 parts of copper sulfate in 200 parts of water, a solution of 55 parts of potassium cyanide in 100 parts of water, with heating, the cupric cyanide formed being decomposed to cuprous cyanide while cyanogen escapes.

The diazonium chloride-cuprous cyanide slurry is heated on a steam bath for two hours longer, and it is then poured into isopropanol. The precipitate of poly(4-cyanophenylacetylene) product is washed with water and finally isopropanol, and dried.

EXAMPLE 8

Poly(2-nitro-4-aminophenyl acetylene)

In a 250 ml. 3 neck flask equipped with a stirrer, a thermometer and a dropping funnel (to which is attached a condenser), is placed 10.2 g. (0.1 mole) of poly(2,4-dinitrophenyl acetylene), 100 ml. of dimethylacetamide is added, and the polymer is dissolved by heating to reflux. To this solution is added, dropwise, with stirring and heating, 6.8 g. $(NH_4)_2S$ (0.1 mole) dissolved in the minimum amount of water to get it into solution. After all the ammonium sulfide has been added, the polymer, poly (2-nitro-4-aminophenyl acetylene), is precipitated into water, filtered, washed with water and dried.

EXAMPLE 9

A sample of poly(p-nitrophenyl acetylene) is prepared as described in Examples 1 and 2 above.

Figure 2:
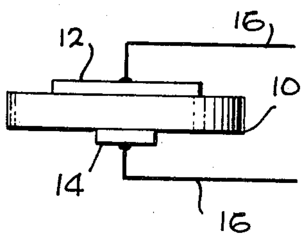
FIG. 2 is a side view of the embodiment of FIG. 1.

Referring to FIGS. 1 and 2 of the drawing, a disk 10 of this material is prepared by pressing the powdered poly(p-nitrophenyl acetylene) material at 12 to 20 tons per square inch pressure. Lead electrodes 12 and 14 are vacuum deposited onto each side of the disc 10, and to each of such lead electrodes is attached a silver wire 16 with silver paste.

Figure 3:
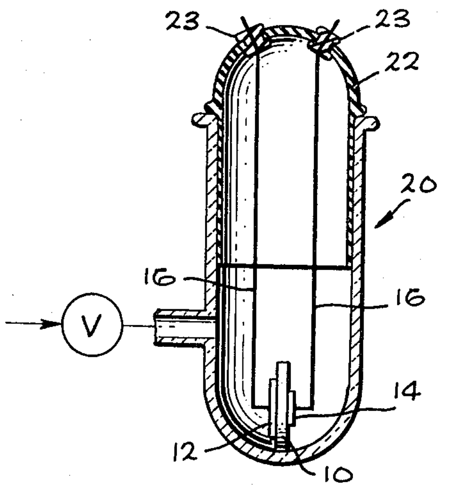
FIG. 3 shows the incorporation of the detection device of FIGS. 1 and 2 in a chamber into which gases to be detected are introduced.

The entire assembly is then placed into a glass tube of the type illustrated at 20 in FIG. 3 of the drawing and covered with a rubber stopper 22. The silver wires 16 of the test sample are taken through grommets 23 in the stopper so that a vacuum when attained in the tube can be so maintained. Into the tube 20 containing the test sample including the polymer disk 10 is placed about 10 drops of malathion (a pesticide analogous to some of the nerve gases). The entire system is placed into a vacuum oven, with the stopper 22 held loosely over the end of the glass tube 20, and the pressure reduced to 20 inches of mercury while the temperature is brought up to 70° C. The tube and its contents are kept in this fashion for 16 hours and then the stopper quickly pushed into place to maintain the malathion atmosphere over the disk 10.

A similar procedure and arrangement are employed with benzene.

The results of the conductivity of the poly(p-nitrophenyl acetylene) sensor device on exposure to these vapors and upon removal of the vapors are shown in Table I below.

TABLE I

| | Ohm-cm. |
|---|---|
| None | $1.1\times10^{14}$ |
| Malathion vapors [a] | $3.1\times10^{13}$ |
| Removal of malathion [b] | $2.7\times10^{14}$ |
| Benzene vapors | $3.7\times10^{13}$ |

[a] Malathion vapor equilibrated with disk for 16 hours at 70° C. under 20 in. Hg vacuum.
[b] Heated disk at 70° C. for 1 hour under 30 in. Hg vacuum to remove malathion.

EXAMPLE 10

Figure 4:
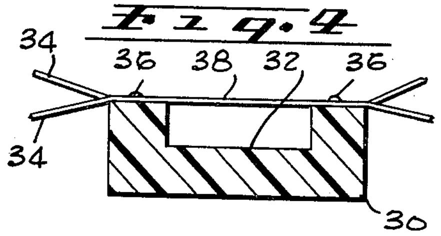
FIG. 4 is a side view of another embodiment of detection device employing the semiconductive materials of the invention, employing wire electrodes.
Figure 5:
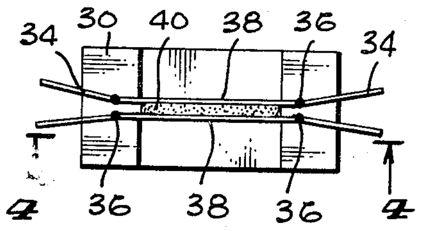
FIG. 5 is a plan view of the detection device in FIG. 4.

Referring to FIGS. 4 and 5 of the drawing, a sensing or detecting device is shown employing a semiconductive polymer according to the invention and composed of a Teflon base 30 having a recess 32 in one surface thereof. Two silver wires 34 are positioned in close parallel relation to each other across the recess 32 and are each connected at their opposite ends to terminals 36. Hence, it is seen that the central portion 38 of the wires 34 are spaced from all surfaces of the Teflon block 30 and are spaced a distance of about 0.5 mil from each other. Unto this central portion 38 of each of the silver wires 34 is placed a solution of poly(p-aminophenyl acetylene). The resulting solution following evaporation of the solvent, completely encases the two wire portions 38 and forms a film 40 of the polymer extending between and across such two wire portions 38.

This entire unit is placed into a stoppered tube of the type described above and illustrated in FIG. 3 and some iodine crystals are placed in the tube. After the iodine has vaporized it becomes coated on the surface of the polymeric film 40.

The conductivity of the sensor including the poly(p-aminophenyl acetylene) semiconductor changes substantially in the presence of iodine, from its conductivity in the absence of iodine.

From Examples 9 and 10 above, it is readily seen that each substance tested causes a change in the conductivity of the polymer, functioning as a semiconductor, thereby rendering it feasible to detect, and ultimately to identify, the introduced impurity.

EXAMPLE 11

Figure 6:
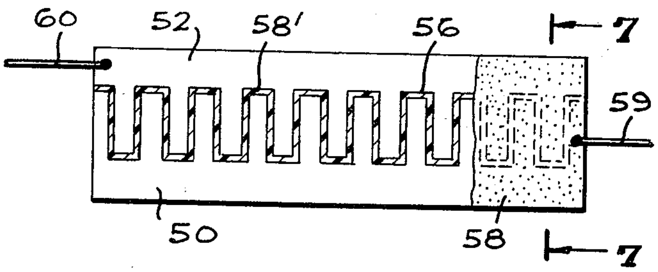
FIG. 6 is a plan view of another form of detection device employing a lock and key type electrode system, employing the semiconductive organic polymers of the invention.
Figure 7:
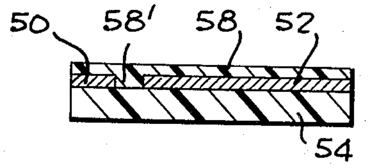
FIG. 7 is a section taken on line 7—7 of FIG. 6.

A modification of a sensing or detecting device is provided employing a semiconductive polymer according to the invention, as illustrated in FIGS. 6 and 7 of the drawing. According to this embodiment, two lead electrodes 50 and 52 are vacuum deposited unto a glass slide 54, the electrodes 50 and 52 being spaced from each other on the slide by a serpentine area indicated at 56, forming a so-called lock and key pattern of electrodes. Over the electrodes 50 and 52 and in the serpentine space 56 between the electrodes is deposited a semiconducting polymer of the invention, poly(p-nitrophenyl acetylene), as indicated at 58 and 58'. A pair of silver wires 59 and 60 are connected to electrodes 50 and 52.

The advantages of this sensor system or device are that the electrodes 50 and 52 are removed from contact with the contaminant vapors which are to be tested, thus improving the reliability of the device.

The device shown in FIGS. 6 and 7 can be used to detect various substances such as amines, e.g., triethylamine and morpholine, by placing the entire device inside a tube or chamber of the type shown in FIG. 3, evacuating the tube, introducing the vapors into the tube, and determining the conductivity or resistivity of the device in the presence of the respective vapors.

From the foregoing, it is seen that the invention provides a class of novel organic semiconductors in the form of polyunsaturates having a conjugated backbone to which are connected aryl side groups capable of being substituted by a wide variety of electronegative or electropositive groups, which electronegativity or electropositivity is transmitted through such aryl side groups to the polymer backbone. Another feature of the invention is the provision of substituted polyphenyl acetylenes providing a preferred class of such semiconducting materials, and a further feature resides in the provision of a novel procedure for producing the polyunsaturates hereof through a dehydrohalogenation reaction which minimizes degradation of the molecular weight of the polymer starting material during the procedure for producing the final substituted polyunsaturate.

While I have described particular embodiments of my invention for the purpose of illustration, it should be understood that various modifications and adaptations thereof may be made within the spirit of the invention, and within the scope of the appended claims.

I claim:

1. A process for the preparation of a poly(phenylacetylene) which comprises dehydrohalogenating a poly(alphachlorostyrene) by heating a mixture of the latter and nitrobenzene in the presence of zinc chloride, at reflux temperature.

2. A process for preparing poly(nitrophenyl acetylene) which comprises reacting polystyrene with chlorine to form poly(alphachlorostyrene), heating at reflux temperature a mixture of poly(alphachlorostyrene) and nitrobenzene in the presence of zinc chloride to produce poly(phenylacetylene) and reacting sad poly(phenylacetylene) with a nitrating agent to form poly(nitrophenyl acetylene).

References Cited

UNITED STATES PATENTS

| | | | |
|---|---|---|---|
| 2,572,420 | 10/1951 | Zenftman et al. | 260—93.5 |
| 3,051,693 | 8/1962 | Leto | 260—94.1 |
| 3,098,843 | 7/1963 | Luttinger | 260—94.1 |
| 3,174,956 | 3/1965 | Luttinger | 260—94.1 |

FOREIGN PATENTS

| | | | |
|---|---|---|---|
| 530,753 | 3/1955 | Italy | 260—94.1 |

OTHER REFERENCES

Chem. Abstract—vol. 59, p. 482E, 1963.

Cristol et al.—Journal American Chem. Soc., vol. 76, April-June 1954, pp. 3005–9.

JAMES A. SEIDLECK, Primary Examiner

U.S. Cl. X.R.

260—47 VA, 78.4 N, 79.5 NV, 94.1; 117—132, 232; 252—500; 338—54